United States Patent [19]

Weaver et al.

[11] 4,101,072
[45] Jul. 18, 1978

[54] DATA-GATHERING DEVICE FOR SCANNING DATA HAVING A VARIABLE AMPLITUDE MODULATION AND SIGNAL TO NOISE RATIO

[75] Inventors: Daniel J. Weaver, San Jose, Calif.; Robert Treiber, Centerport, N.Y.; Joseph Pernyeszi, Mountain View, Calif.

[73] Assignee: The Singer Company, Binghamton, N.Y.

[21] Appl. No.: 734,694

[22] Filed: Oct. 21, 1976

[51] Int. Cl.² .................... G06K 7/10; G06K 11/02
[52] U.S. Cl. .................................................. 235/455
[58] Field of Search .............. 235/61.7 R, 61.11 B, 235/0.12 N; 340/146.3 AG, 146.3 F

[56] References Cited

U.S. PATENT DOCUMENTS

| 3,909,594 | 9/1975 | Allais et al. | 235/61.11 E |
| 3,949,233 | 4/1976 | Gluck | 235/61.11 E |

Primary Examiner—Vincent P. Canney
Attorney, Agent, or Firm—Paul Hentzel; Jeffrey Rothenberg

[57] ABSTRACT

A light pen is scanned across a bar coded label to produce a reflected light signal having a modulated intensity. The average peak-to-peak value of the plus and minus peaks of the return signal is continuously generated to provide a reference for detecting each subsequent positive and negative transistion. The instantaneous average peak-to-peak reference permits the positive transistions to be distinguished from the negative transistions in spite of large deviations in the amplitude modulation and large shifts in the signal to ambient light level ratio of the return signal. Initially the light pen is operated in a low power pulsed mode. The initial transistions in the return signal cause the pen to temporarily illuminate the bar coded label with a continuous light, and activate plus and minus peak detectors.

7 Claims, 8 Drawing Figures

Fig. 2
POWER MODULE 140

Fig_3

Fig_4
SERVICE MODULE 120

Fig.6

DATA-GATHERING DEVICE FOR SCANNING DATA HAVING A VARIABLE AMPLITUDE MODULATION AND SIGNAL TO NOISE RATIO

FIELD OF INVENTION

This invention relates to devices for scanning data, and more particularly to scanning data having a wide variance in color contrast and surface reflectivity.

DISCUSSION OF THE PRIOR ART

Heretofore scanning light pens employed a low power monochromatic light source for scanning black and white data. A highly amplitude modulated-noise isolated signal was obtained because the black absorbed most of the incident light and the white reflected most of the incident light. The emmission frequency of the light source in the pen could be chosen to accommodate special light and dark pigments. However, monochromatic lamps could not be used to detect data across the wide range of color combinations appearing in commercial trade dress. Wide emission spectrum incandescent lamps were used to detect over a plurality of color schemes. However, these thermal radiation sources had a high power requirement, especially at high intensities, and generated nonuniform amplitude modulation due to the divergent absorption characteristic between the various color schemes. Further, the nonuniform emission spectrum of the thermal light source and nonuniform response spectrum of the reflected light sensor created additional nonuniformities in amplitude modulations. The signal to noise ratio from these prior art systems were equally arbitrary. Aging lamps, fluctuating supply voltages, label printing quality and deterioration, dust, ambient light changes, operator technique, all contributed to divergent signal to noise ratios. The prior art pen scanners required constant calibration and adjustment to interface properly with these factors.

SUMMARY OF THE INVENTION

Accordingly, it is the object of this invention to provide a wide spectrum light pen data-gathering device:

which can accommodate a wide range of amplitude modulations;

which is responsive to various light and dark color combinations;

which can accommodate a wide range of scanning rates;

which can accommodate a wide range of signal to noise ratios; and which has a low power requirement.

BRIEF DESCRIPTION OF THE DRAWING

Further objects and advantages of this invention and the operation of the scanner circuit will become apparent to those skilled in the art from the following detailed descriptions taken in conjunction with the drawings, in which:

FIG. 3 is a block diagram of the control module showing the microprocessor and peripheral hardware;

GENERAL SYSTEM

Figure 1:
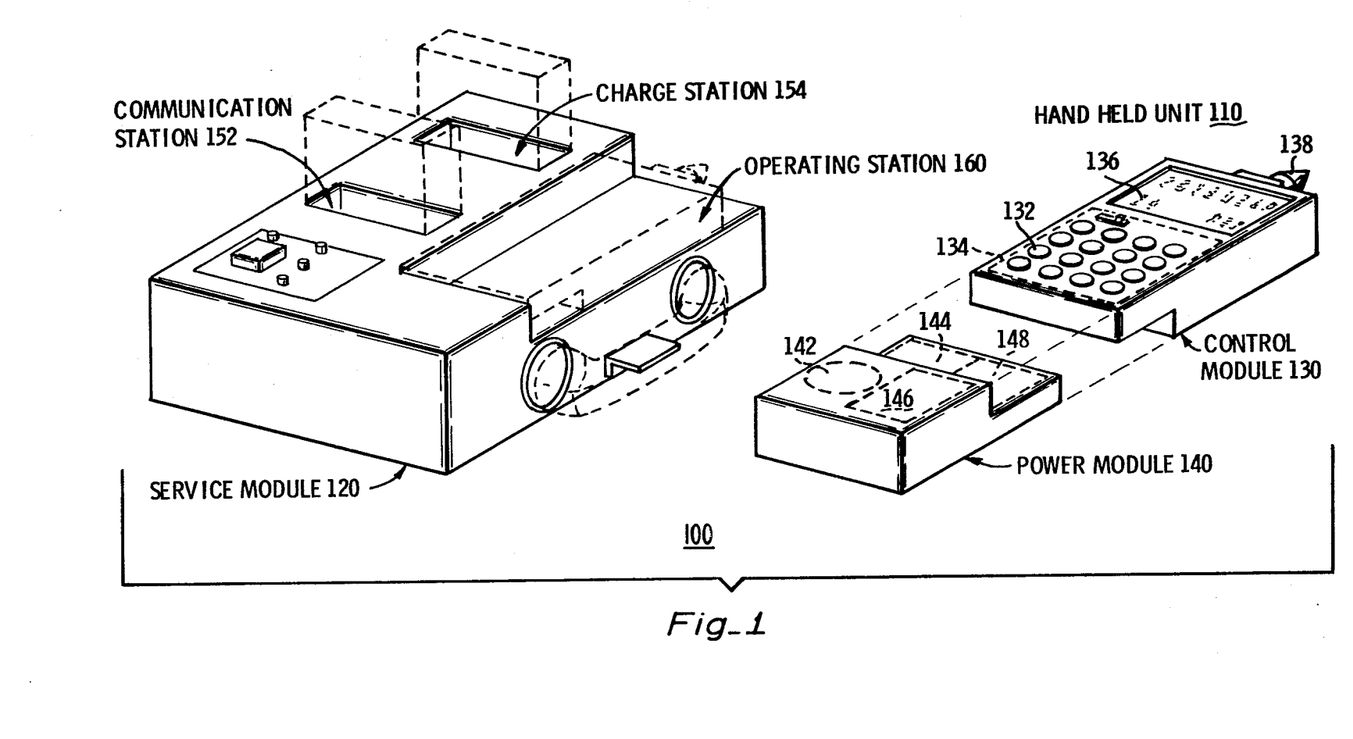
FIG. 1 is an isometric view of the power module and control module which form the portable hand-held unit, and the service module which cooperates therewith to provide stationary operation.
Figure 2:
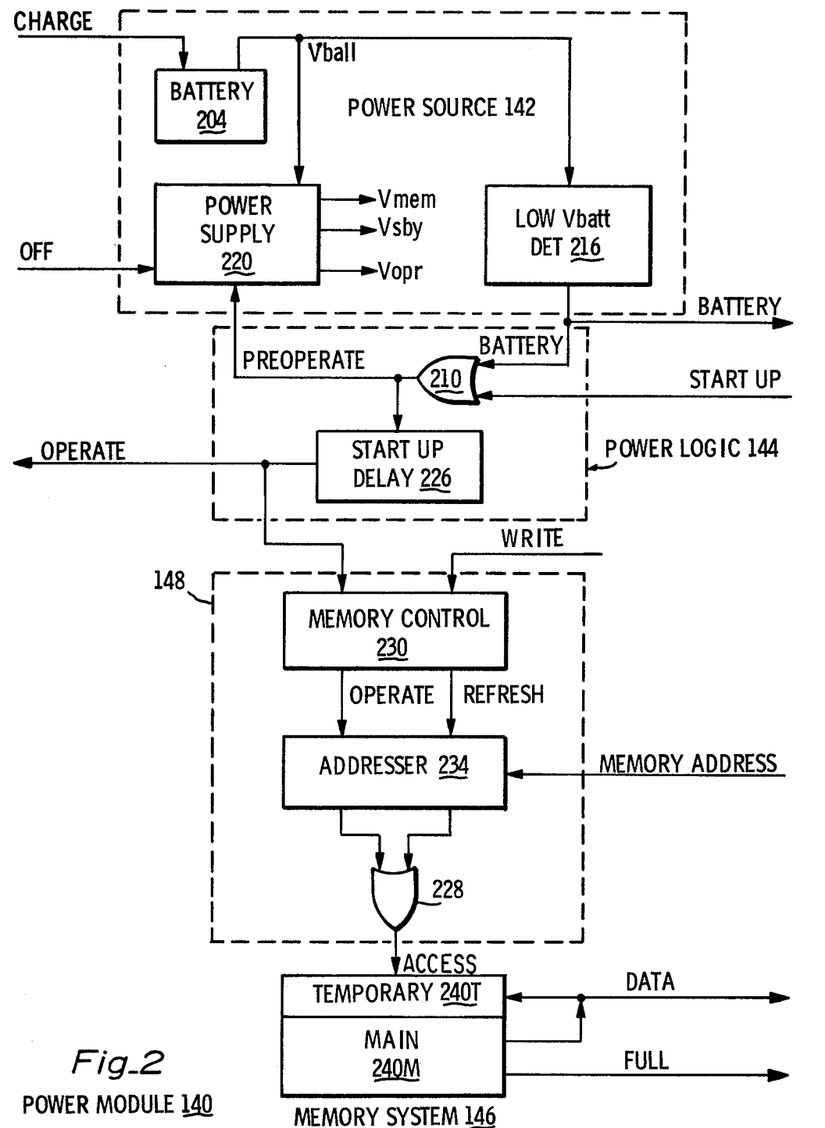
FIG. 2 is a block diagram of the power module showing the memory and memory control circuitry.
Figure 4:
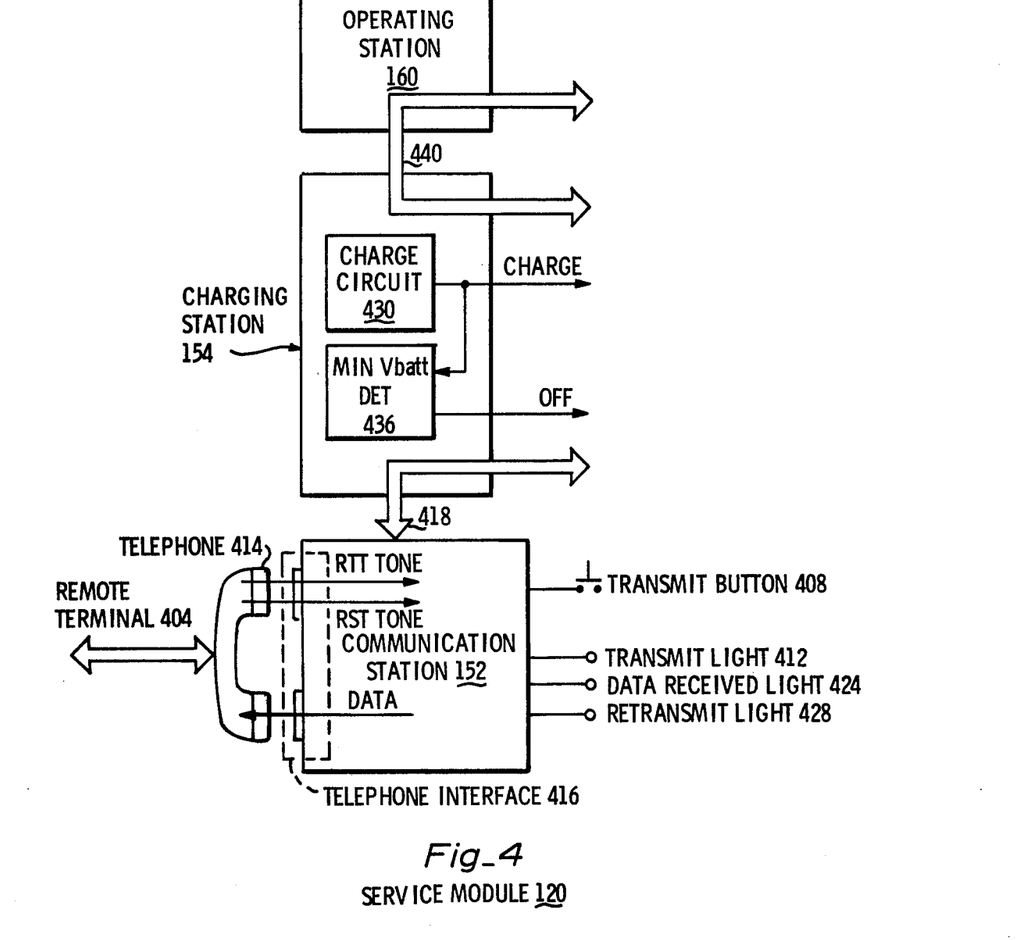
FIG. 4 is a block diagram of the service module showing the charging and transmission features.

FIG. 1 shows a portable data gathering system 100, and FIGS. 2, 3, and 4 are related block diagrams of data flow and control features. System 100 includes a portable hand-held unit 110 and a stationary service module 120. Hand-held unit 110 is separable into a control module 130 and a power module 140. Control module 130 contains keyboard 132 for entering data (KEY DATA) and instructions (INSTRUCTIONS) to control logic 134, and an alphanumeric display 136 for displaying data from data port 138 (PORT DATA).

Power module 140 contains a power source 142 and power control logic 144 for providing a low power STANDBY MODE when control module 130 is not active, and an OPERATE MODE when new data enters control module 130. A standby voltage (Vsby) is applied throughout unit 110 to maintain the standby status. During the OPERATE MODE power source 142 applies an operate voltage (Vopr) to activate data flow and control circuits. Power module 140 also contains a suitable storage device such as solid state memory system 146 and accompanying control logic 148 for receiving and storing data from control module 130. Memory system 146 is mounted on same module as power source 142 and always receives a memory sustaining voltage (Vmem) therefrom. As a result, the data in memory system 146 cannot be unintentionally erased by disconnecting the power.

New data such as product numbers is entered into solid state memory 146 automatically as PORT DATA through data port 138 or manually as KEY DATA through keyboard 132. Keyboard 132 may also have provisions for additional functions to accommodate various other categories of data such as price and quantity, and to recall data from memory 146 onto display 136. When memory 146 reaches capacity, power module 140 is removed from control module 130 and inserted into communication station 152 of service module 120 (as shown in dashed lines) for transmitting the data in memory system 146 to a remote terminal. The battery 204 in power source 142 may be recharged at station 142 simultaneously with transmission. Alternatively, power module 140 may be inserted into charge station 154 (as shown in dashed lines) for storage and charging. Control module 130 may be inserted into operate station 160 (as shown in dashed lines) where it is reactivated and reconnected with memory system 146 in power module 140. Modules 130 and 140 become fully operative as a stationary data gathering device when mounted in service module 120.

STANDBY-OPERATE MODES

Hand-held unit 110 is normally in a low power STANDBY MODE in which many of the subsystems circuits are deactivated to conserve power in battery 204.

OPERATION MODE is initiated by PORT DATA from data port 138 or KEY DATA and INSTRUCTIONS from keyboard input 132. Microprocessor 134 responds to these signals by forwarding START UP to power logic 144 in power module 140 (see FIG. 2). Startup gate 210 combines START UP with BATTERY from low Vbatt detector 216 to form PREOPERATE to power supply 220 causing the generation of the operating voltage (Vopr) initiating OPERATION MODE. Vopr activates the operating circuits throughout system 110 allowing microprocessor 134 to process data. OPERATION MODE cannot be established when battery 204 approaches discharge and Vbatt drops below a predetermined low value (Vlow). $\overline{BATTERY}$ inhibits gate 210 preventing the generation of Vopr. The remaining power in battery 204 is dedicated to maintaining the data in memory system 146. $\overline{BATTERY}$ to microprocessor 134 causes activation of alarm 304 (see FIG. 3).

Shortly after PREOPERATE, startup delay circuit 226 provides OPERATE to memory control 230 which generates an internal REFRESH signal. Either OPERATE or REFRESH into addresser 234 enables $\overline{gate\ 228}$ causing ACCESS into memory system 146. $\overline{ACCESS}$ present during STANDBY MODE prevents addresses from reaching memory system 146 (formed by temporary memory 240T and main memory 240M) by inhibiting a series of internal address gates. $\overline{ACCESS}$ additionally protects the data in memory 240 from spurious input by placing memory 240 in the read mode. ACCESS enables the address gates and permits memory 240 to be in either the write mode (WRITE) or the read mode ($\overline{WRITE}$) as determined by microprocessor 134.

OPERATION MODE is terminated by the expiration of a WAIT PERIOD (three seconds, for example) in microprocessor 134 initiated at START UP. WAIT PERIOD is renewed by each new PORT DATA, KEY DATA, or INSTRUCTIONS item.

PORT DATA

PORT DATA originates from a data source such as product label 306 in suitable form such as bar code 308 (see FIG. 3). PORT DATA enters hand-held unit 110 through data port 138 on probe 310 extending from control module 130. Probe 310 is placed proximate data source 306. Probe lamp 314 illuminates data source 306 causing initial reflected light to be conducted by light pipe 318 into light detector 320. Hand-held unit 110 is moved or turned slightly causing data port 138 to scan across data source 306. During scanning bar code 308 causes modulations in the reflected light level to detector 320 which forwards MODULATION to microprocessor 134. MODULATION cannot be processed through microprocessor 134 during STANDBY MODE.

In STANDBY MODE lamp drive 324 pulses lamp 314 periodically illuminating the region immediately adjacent data port 138. Once or twice a second is a suitable pulse rate. The pulse rate is established by an internal oscillator in lamp drive 324. STANDBY MODE continues until the initial reflected light is returned through data port 138 into detector 320. Detector 320 then forwards LAMP ON to lamp drive 324 which inhibits the internal pulsing oscillator causing lamp 314 to operate continuously. Detector 320 simultaneously forwards the initial return light level modulation to microprocessor 134 (MODULATION) which forwards START UP to gate 210 in power logic 144 and initiates WAIT PERIOD (3 seconds, for example). During WAIT PERIOD unit 110 is in DATA PROCESS MODE and MODULATION enters microprocessor 134 to determine whether the sequence of light levels is allowed data (PORT DATA from bar code 308) or a spuriously generated pulse sequence. PORT DATA is simultaneously advanced to temporary memory 230T and through display drive 330 to display device 136. The first N digits of PORT DATA may be one type of data (such as product number from data source 306) displayed in N digit display 332N, and the next Q digits of data may be another type of data (such as quantity) displayed in Q digit display 332Q. S digit display 332S displays status data generated during operation. The operator may view the new PORT DATA on display 136.

At the expiration of WAIT PERIOD (which is restarted by MODULATIONS) microprocessor 134 reestablishes the pulse lamp operation by forwarding LAMP DISABLE to lamp drive 324 which enables the pulsing oscillator. $\overline{START\ UP}$ terminates Vopr and system 110 is returned to STANDBY MODE.

KEY DATA

Input data, such as product numbers, may be manually entered into hand-held unit 110 through keyboard 132 (which includes keys for digits 0-9) and keyboard logic 340. The first key depressed initiates OPERATION MODE in unit 110 through START UP from microprocessor 134. As N digits of KEY DATA are keyed in, they appear simultaneously in temporary memory 240T and display device 136 starting with the left-hand digit (MSD) of N digit display 332N. The first N digits may be one class of data (product number, for instance), and the next Q digits may be another class of data such as quantity appearing display 332Q. After keying in N digits of product number and Q digits of quantity, the operator may key in CASE causing a low case "c" to appear in the LSD of display 332Q. This case data is processed to temporary memory 240T and then into main memory 240M. A data processor at remote terminal 404 will interpret this entry as an order by the case of the identified product. Alternatively, the operator may key in PRICE causing a lower case "p" to appear in display 332Q. This entry is interpreted as a request for price of a particular quantity of the identified product. OPERATION MODE is terminated after expiration of WAIT PERIOD which is renewed after each item keyed in.

KEYBOARD INSTRUCTIONS

Control signals are communicated to microprocessor 134 through INSTRUCTION keys on keyboard 132. Any INSTRUCTION immediately initiates OPERATION MODE.

ENTER INSTRUCTION causes the KEY DATA or PORT DATA in temporary memory 240T to enter main memory 240M at an address specified by microprocessor 134 (MEMORY ADDRESS). If desired ENTER may also extinguish display device 136 in order to conserve power in battery 204.

CLEAR INSTRUCTION causes erroneous KEY DATA or PORT DATA to be erased from temporary memory 240T and extinguished from display device 136. By observing display 136, the operator may detect a key in error, or notice an anomoly between the product number on data source 306 and the number in display 332N. Further, microprocessor 134 monitors for errors by continuously comparing the content of temporary memory 240T with the data displayed in device 136, and provides ERROR to alarm 304 as required.

RECALL INSTRUCTION has a SELECT MODE in which a particular previous product number (or portion thereof) is recalled, and a SEQUENTIAL MODE in which the entire contents of main memory 240M is systematically recalled. In SELECT MODE the desired product number (or portion thereof) is keyed in and the RECALL key depressed. Microprocessor 134 searches main memory 240T comparing every previous entry to the argument in temporary memory 240T. When a comparison is reached, the quantity originally entered with the desired product number appears in display 332Q, and alarm 304 is activated by an end-of-search signal (EOS) for microprocessor 134. In SEQUENTIAL MODE the RECALL key is pressed repeatedly and each entry in main memory 240M appears in displays 332N and 332Q starting with the most recent entry.

INFO INSTRUCTION deactivates the normal check digit required for normal entry to permit the entry of free format data such as dates, names and other miscellaneous information.

RESUME INSTRUCTION is employed when power module 140 is returned from service module 120 to control module 130 with a partially filled memory 240. RESUME INSTRUCTION permits microprocessor 134 to process the next data in to memory 240 at a LAST ENTRY POINTER to retain continuity between the new data and the previously gathered data. If the data in the returned power module 140 has already been transmitted or is otherwise no longer required, then preferably microprocessor 134 will start entering data at the beginning of memory 240 and ignore LAST ENTRY POINTER. This result is obtained by INITIALIZING microprocessor 134 with a CLEAR INSTRUCTION in combination with an INFO INSTRUCTION.

C/P/S INSTRUCTION is employed to order case quantities instead of individual quantities, by depressing the C/P/S key once and then entering the number of cases. Prices, quotes and availability may be requested by depressing the C/P/S key twice and three times respectively. These requests are transmitted to remote terminal 404 by communication station 152. The response may be received from remote terminal 404 by communication station 152, and entered into memory system 146. The operator then displays the responses on display 136 through the RECALL INSTRUCTION.

SERVICE MODULE 120

After the data gathering with hand-held unit 110 is completed, the operator removes power module 140 from control module 130 and inserts it into communication station 152 (see FIG. 4). TRANSMISSION MODE is effected by depressing transmit button 408 which energizes transmit panel lamp 412. The operator first secures the remote station through the conventional telephone dialing system and then engages the telephone receiver 414 with telephone interface 416. Data transmission is initiated by RTT TONE from remote terminal 420. Data in power module 140 flows across transmit bus 418 into communication station 152 and out telephone receiver 414. After completion of the data transmission RST TONE from remote station 420 terminates TRANSMISSION MODE and energizes data received panel lamp 424. An erroneous transmission results in RST TONE which energizes retransmit lamp 428.

During portable mode data gathering memory 240 may become full which is indicated by alarm 304 and by an "F" on display 332Q. Also, Vbatt may drop below the threshold of low Vbatt detector 216 generating BATTERY which activates alarm 304 and causes unit 110 to immediately go into STANDBY MODE. The depleted power module is removed from control module 130 deactivating alarm 304, and replaced by a fresh power module with a fully charged battery 204 and an empty memory 240. The depleted power module is inserted into charge station 154 for recharging by charge circuit 430. Charge station 154 also provides temporary storage for power modules between data gathering missions. Preferably communication station 152 also provides for charging battery 204 which also can store power module 140 prior to and after transmission.

Minimum Vbatt detector 436 in charge station 154 monitors Vbatt during charging. If Vbatt drops below Vmin (which is lower than Vlow of low Vbatt detector 216) minimum Vbatt detector 436 provides OFF to power supply 220 terminating Vsby and Vmem. The termination of Vmem in the OFF MODE causes the loss of the data in volatile memory 240. This data may become unreliable after Vbatt drops below Vmin due to reduction of Vmem which is normally regulated through power supply 220 from Vbatt. Further, the reduced load condition accompanying OFF MODE facilitates charging battery 204.

Operating station 160 accommodates control module 130 and permits control module 130 to cooperate with power module 140 at charging station 154 to form a stationary data gathering unit with the same data processing capability as hand-held unit 110. Operate bus 440 between charging station 154 and operating station 160 provides power and data flow connection between power module 140 and control module 130. In the stationary mode, data probe 310 extends toward the backmost side surface of service module 120. The tip of data probe 310 is position generally coplanar with back side surface, permitting the back side surface to function as a guide for the items carrying bar code labels 306. The back side surface causes the items to remain on a path parallel to and equidistant from data probe 310.

Figure 5A:
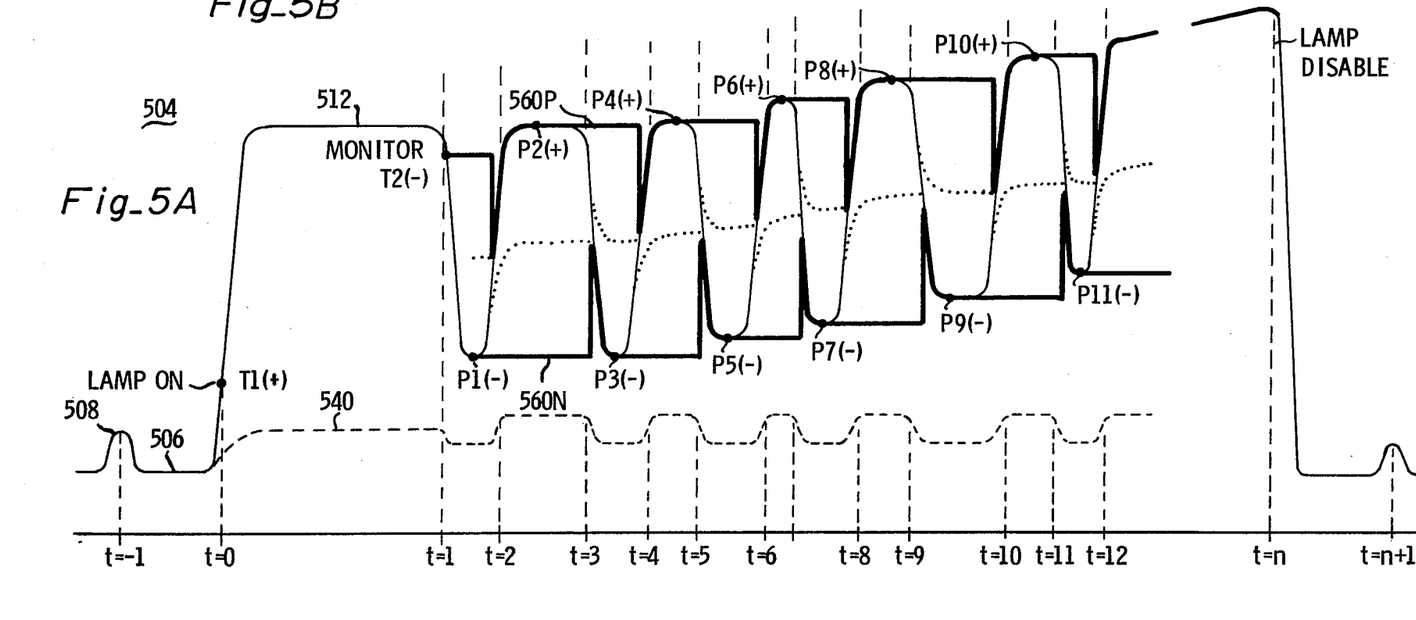
FIG. 5A is a timing diagram showing modulations in the reflected light intensity generated by a typical scan.
Figure 5B:
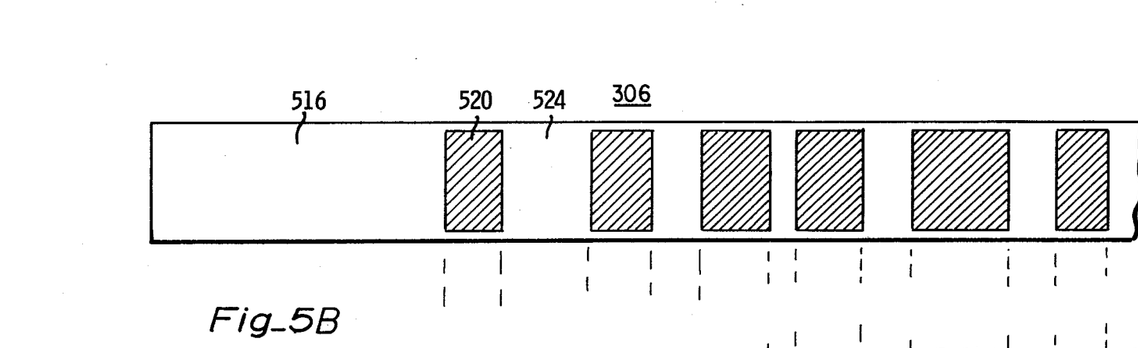
FIG. 5B is a typical bar coded data source positioned in time registration with FIG. 5A.

FIG. 5B shows a typical bar coded data source 306, and FIG. 5A shows reflected light intensity profile 504 (light line) therefrom which is incident upon light pipe 318 as the operator moves probe 310 relative to data source or label 306. At $t=0$, probe 310 approaches label 306 and the first reflected light is received causing positive initial transition T1(+) which establishes the continuous illumination OPERATE mode and LAMP ON. The nominal light intensity 506 prior to $t=0$ is ambient light, with small spaced swells 508 therein ($t=-1$) caused by the standby light pulses from lamp 314. The constant light intensity 512 between $t=0$ and $t=1$ corresponds to reflected light from guard band 516 which forms the initial portion of label 306. At $t=1$, probe 310 encounters the leading edge of guard bar code 520 which is dark (less reflective) causing initial negative transition T2(−) in intensity profile 504. The width of guard bar 520 creates peak P1(−1) in intensity pattern 504. The trailing edge of guard bar 520 (which is also the leading edge of light bar 524) causes positive transition T3(+). The subsequent light and dark code bars generate a sequence of subsequent transistions and peaks containing the data in bar coded data source 306. Negative peaks P1(−), P3(−), etc. correspond to the dark code bars in label 306, and positive peaks P2(+), P4(+), etc. correspond to the light code bars. Detector 320 receives these intensity variations and provides MODULATION to microprocessor 134. Microprocessor 134 processes MODULATION to determine if it is an allowable product number at which time microprocessor 134 provides LAMP DISABLE ($t=n$) to lamp drive 324 terminating the continuous illumination OPERATE MODE and returning unit 110 to the pulse illumination STANDBY MODE. Light intensity profile drops to ambient light level 506 with periodic swells 508 ($t=n+1$) caused by subsequent pulses of light from lamp 314.

The height of plus peaks P2(+), P4(+), etc. is a function of the surface reflectivity of label 306, and the absorption spectrum of the particular color (or colors) forming the light background area of label 306. White reflects the entire spectrum of colors and therefore yields the highest plus peaks of any background color. The smoothness and glossiness of the light background also contributes toward a high plus peak. The reflection from light background colors such as pink, yellow, light blue, light green, etc. create lower peaks due to their absorption spectrum over the spectrum of illumination.

The depth of the minus peaks P1(−), P3(−), P5(−) etc. is a function of the surface reflectivity and absorption spectrum of the particular color (or colors) forming the dark bar code of label 306. The absorption spectrum for black extends across the entire illumination spectrum and produces the lowest minus peaks of any bar color. The porousness and "flatness" of the dark bar also contributes toward a low minus peak. The reflection from less dark bar colors such as dark brown, dark green, dark red, etc. creates a higher minus peak due to their reflection spectrum over the spectrum of illumination.

Each data gathering mission will typically involve many products, each having a specific light and dark color combination, and surface characteristic. Each of these labels will have a unique initial printing quality and present deterioration state. These variances between labels result in wide deviations in amplitude modulation between the plus peaks and minus peaks, and wide deviations in the signal to noise ratio between the modulations and the ambient light level. A low modulation and signal to noise ratio is depicted by light intensity profile 540 shown in FIG. 5 (dashed lines) which is produced by a label having low reflectivity and poor light-dark contrast. Further nonuniformity in the operators scanning action introduce an additional arbitrary input. Each operator will develop unique scanning style, applied inconsistently, involving slight variances in the pressure, azimuth, and tilt between probe 310 and label 306. As a result, the signal to noise ratio will vary from label to label, and even along the scan of an individual label. Intensity profile 504 is shown increasing slightly between $t=3$ and $t=n$ to illustrate the effect of a probe 310 orientation which is improving as the scanning proceeds.

Figure 6:
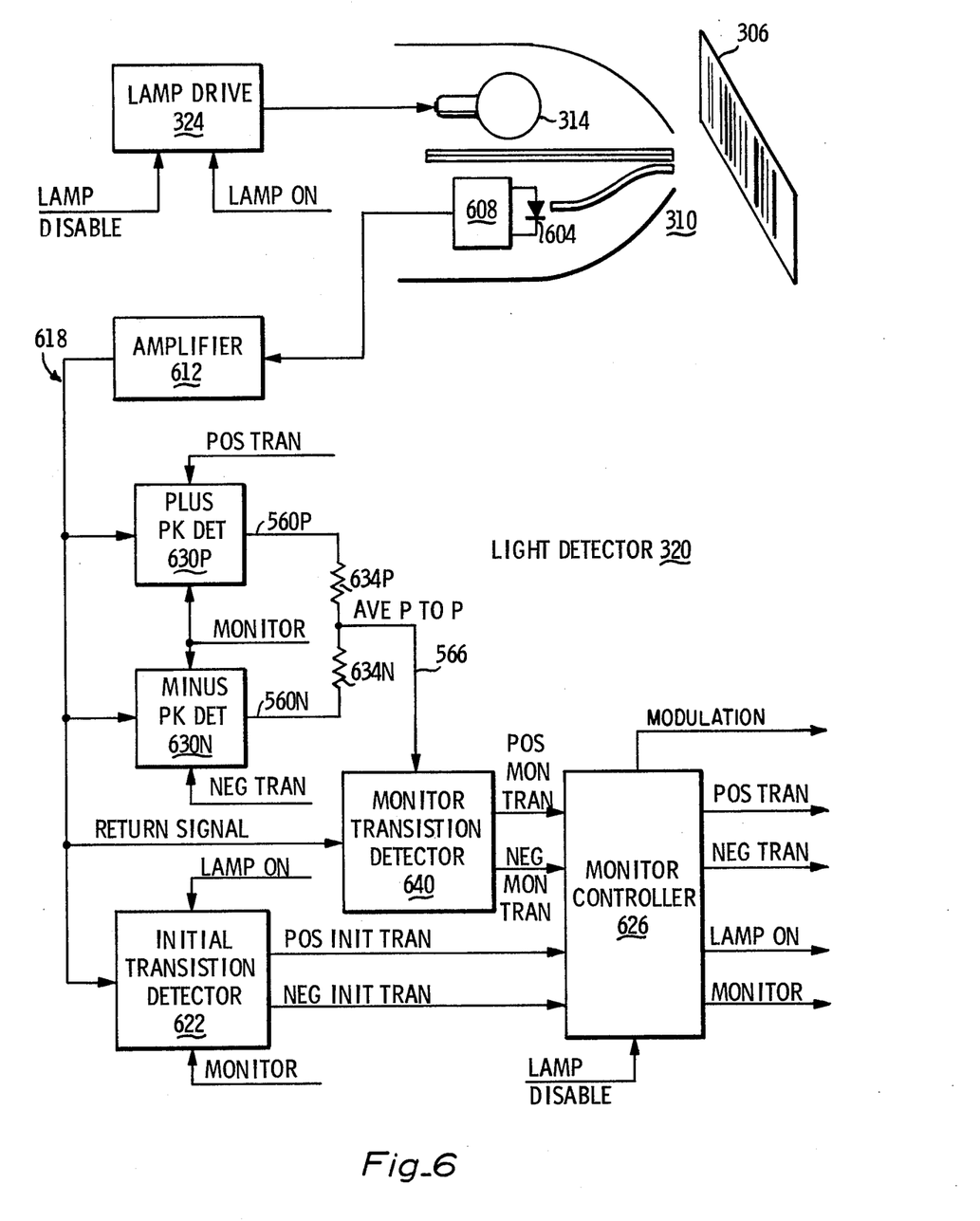
FIG. 6 is a block diagram of light detector 320 of FIG. 3 which receives the modulated light of FIG. 5A.

FIG. 6 shows a block diagram of probe 310, light detector 320, and lamp drive 324. Photodiode 604 responds to the reflected light intensity generating a modulated electric signal which is amplified by preamplifier 608 in probe 310 and subsequent amplifier 612 in light detector 320 to provide RETURN SIGNAL waveform on lead 618. Initial transition detector 622 detects initial positive transistion T1(+) and provides POS INIT TRAN pulse to monitor controller 626 to obtain LAMP ON ($t=0$). LAMP ON activates lamp drive 324, deactivates the positive portion of initial transistion detector 622, and is applied to microprocessor 134 to initiate the OPERATION mode. Initial transistion detector 622 then detects initial negative transistion T2− to provide NEG INIT TRAN pulse to monitor controller 626 to provide MONITOR. MONITOR deactivates initial transistion detector 622 and activates plus peak detector 630P and minus peak detector 630N. Plus peak detector 630P outputs a voltage proportional to the most recent positive peak of RETURN SIGNAL. The plus peak voltage is updated after each positive transistion of RETURN SIGNAL. Similarly, minus peak detector 630N provides an output voltage proportional to the most recent minus peak of RETURN SIGNAL. The peak voltages from peak detectors 630 are applied to either end of voltage dividing network 634 which provides the average of the peak-to-peak RETURN SIGNAL voltage (AVE P to P). AVE P to P is updated with the most recent plus peak after each positive transistion in RETURN SIGNAL, and by the most recent minus peak after each negative transistion in RETURN SIGNAL. AVE P to P makes incremental adjustments as label 306 is scanned to accommodate the most recent plus and minus peaks in light intensity profile 504. The peak adjusted output of plus peak detector 630P is shown in bold lines 560P on profile 504. Plus peak detector 630P is activated by T2(−) at $t=1$ causing peak adjusted output 560P to assume the immediate value of profile 504. Thereafter, output 560P follows the plus peaks of profile 504. Similarly the peak adjusted output 560N of minus peak detector 630N follows the minus peaks of profile 504. AVE P to P is shown at 566 (dotted line). AVE P to P is applied to monitor transistion detector 640 along with RETURN SIGNAL for providing POS TRAN in response to positive transistions in RETURN SIGNAL which pass through AVE P to P; and for providing NEG TRAN in response to negative transistions in RETURN SIGNAL which pass through AVE P to P. Monitor controller 626 receives POS TRAN and NEG TRAN and provides a series of pulses (MODULATION) with spacing corresponding to the leading edges of the light and dark code bars on label 306.

DETAILED DESCRIPTION OF PREFERRED EMBODIMENT

Figure 7:
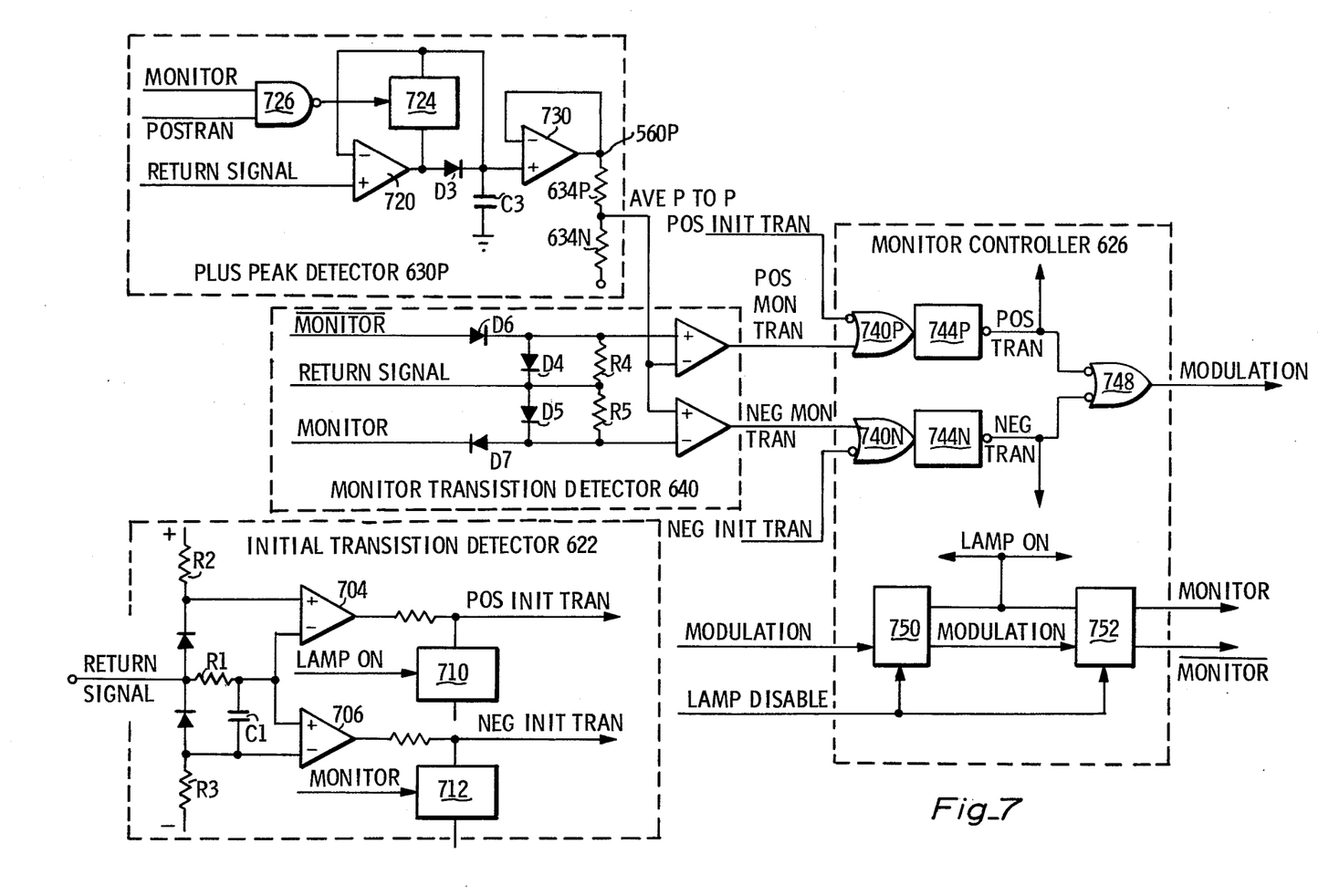
FIG. 7 is a schematic diagram showing the circuit elements in each block of the detector 430 of the FIG. 6 embodiment.

FIG. 7 is a schematic diagram showing the circuit elements in each block of light detector 320. The specific components and operation of each block are disclosed below.

Initial Transition Detector 622

RETURN SIGNAL is integrated by RC network formed by R1 (47K ohms) and C1 (4.7 microfarads) and applied to comparison amplifiers 704 and 706 (72LO44). RETURN SIGNAL is plus offset by D1 and +5 volts through resistor R2 (4700 ohms), and applied to amplifier 704. Amplifier 704 provides POS INIT TRAN through R2 (100K ohms) in response to the integrated and offset inputs. Analog switch 710 responds to LAMP ON for clamping POS INIT TRAN at −5 volts for deactivating the positive initial transition detecting portion of detector 622. RETURN SIGNAL is similarly minus offset by D2 and −5 volts through resistor R3 (4700 ohms), and applied to amplifier 706 for providing NEG INIT TRANS through R3 (100K ohms), which is clamped to −5 volts by analog switch 712 in response to MONITOR.

Plus Peak Detector 630P

RETURN SIGNAL is stored in capacitor C3 (0.033 microfarads) through amplifier 720 (CA3130T). Diode D3 maintains C3 at the peak RETURN SIGNAL. Analog switch 724 is normally closed for bypassing D3 and opens in response to MONITOR and POS TRAN through NAND gate 726. Prior to MONITOR, when switch 724 is closed, and plus peak detector 630P merely tracks RETURN SIGNAL. Buffer amplifier 730 (SN72L044) applies plus peak 560P to averaging resistor 634P (37.4K ohm, 1%). Minus peak detector 630N is similar to 630P, and applies minus peak signal 560N to averaging resistor 634N (37.4K ohms, 1%). Resistors 634 may be weighted to raise or lower AVE P to P as desired. In the embodiment shown resistor 634P is equal to resistor 634N and AVE P to P is the true average value between 560P and 560N.

Monitor Transition Detector 640

Prior to MONITOR (t=1) RETURN SIGNAL is continuously plus offset by diode D5 and resistor R4 (1K ohm) and applied to comparing amplifier 736P (SN72L044). RETURN SIGNAL is simultaneously minus offset by diode D5 and resistor R5 (1K ohms), and applied to comparing amplifier 736N (SN72L044). Comparing amplifiers 736 compare the offset inputs to the average signal from peak detectors 630 (which at this time is not AVE P to P) for maintaining high outputs into monitor controller 626. After MONITOR the off-sets are eliminated by MONITOR bar and MONITOR applied through diodes D6 and D7, and peak detectors 630 clamp on the peak values. After MONITOR, amplifiers 736 compare RETURN SIGNAL to AVE P to P for providing POS MON TRAN and NEG MON TRAN each time AVE P to P intersects RETURN SIGNAL.

Monitor Controller 626

POS INIT TRAN and POS MON TRAN are ORed through OR gate 740P and applied to one shot device 744P (MC14528) for providing POS TRAN (50 microseconds) having sufficient pulse width to be compatible with microprocessor 134, but also short enough to properly reset plus peak detector 630P. NEG INIT TRAN and NEG MON TRAN are similarly ORed to provide NEG TRAN via one shot device 744N. POS TRAN and NEG TRAN are then ORed through OR gate 748 to provide MODULATION for microprocessor 134 and for clocking lamp flip flop 750 and monitor flip flop 752. Sequential flip flops 750 and 752 are reset by LAMP DISABLE.

CONCLUSION

Hence, it is readily apparent that the present invention will accommodate a wide range of scanning speeds. AVE P to P is updated with each new transition, unlike the prior art RC averaging networks with a fixed time constant and therefore an optimum scanning speed. The time constant of the prior art RC averaging circuit created a fixed rise time or delay between detecting the label and and reading the code referred to as "probe settling time". AVE P to P has a very small rise time determined by C3 (which is very small). C3 stores the most recent peak voltage and provides bias current to buffer amplifier 730. C3 is independent of the scanning rate and creates a negligible "settling time".

The dynamic nature of AVE P to P permits light detector 320 to accommodate large fluctuations in amplitude modulation and signal to noise. AVE P to P is continuously reset to receive any size subsequent transition.

It will be apparent to those skilled in the art that various changes may be made in the described apparatus and technology without departing from the scope of the invention. For example, a label with a dark background and light bar code may be employed by modifying the initial transition detector and internal timing of light detector 320. Accordingly, the scope of this invention should be determined only by the wording of the following claims and their legal equivalents.

We claim as our invention:

1. Apparatus having a standby mode for initially illuminating a data source in relative motion therewith with pulses of light and detecting initial transitions in the intensity of the light reflected from the data source, and having an operate mode thereafter for illuminating the data source with a continuous light and detecting subsequent transitions in the intensity of the light reflected from the data source, comprising:

a lamp driver means having a pulse output during the standby mode and a continuous output during the operate mode;

a lamp means responsive to the lamp driver for illuminating the data source with pulses of light during the standby mode and with continuous light during the operate mode;

a light sensitive means responsive to the transitions in the intensity of the light reflected from the data source for providing a return electric signal with corresponding transitions;

initial transition detecting means responsive to the return signal from the light sensitive means for detecting the transitions therein corresponding to the initial transitions in the reflected light;

mode control means responsive to the initial transition detecting means for temporarily establishing the continuous operate mode within the lamp driver;

resettable peak detector means for retaining the most recent plus and minus voltage peaks of the return signal from the light sensing means for maintaining an average peak to peak signal; and operate transition detector responsive to the average peak to peak signal from the peak detector means and to subsequent transitions in the return signal from the light sensing means for detecting transitions therein relative to the average peak to peak signal to provide transistion signals which reset the peak detector means to the most recent plus and minus voltage peaks.

2. The apparatus of claim 1, wherein an early initial transition in the return signal causes the initial transition detection means to activate the mode means to establish the continuous operate mode, and a later initial transition in the return signal causes the initial detection means to activate the peak detector means.

3. The apparatus of claim 2, wherein the early initial transition in the return signal corresponds to the first positive transition in the reflected light intensity, and the later initial transition in the return signal corresponds to the first negative transition in the reflected light intensity.

4. The apparatus of claim 1, wherein the initial transition detecting means is responsive to the first initial transition in the return signal for causing the mode control means to temporarily establish the continuous operate mode.

5. The apparatus of claim 1, wherein the peak detector means includes a plus peak detector circuit and a minus peak detector circuit.

6. The apparatus of claim 5, wherein each peak detector circuit includes a capacitor for retaining the most recent peaks of the return signal.

7. The apparatus of claim 6, wherein the capacitors maintain the peak voltages of the return signal at a constant level until the peak detector circuits are reset by the transition signals from the operate transition detector.

* * * * *